(12) United States Patent
Wendt et al.

(10) Patent No.: US 11,757,544 B2
(45) Date of Patent: Sep. 12, 2023

(54) METHOD TO IMPROVE RF-BASED ATMOSPHERIC CONDITIONS DETECTION AND RF-BASED NETWORK COMMUNICATIONS

(71) Applicant: SIGNIFY HOLDING B.V., Eindhoven (NL)

(72) Inventors: Matthias Wendt, Wurselen (DE); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 20 days.

(21) Appl. No.: 17/637,008

(22) PCT Filed: Aug. 20, 2020

(86) PCT No.: PCT/EP2020/073316
§ 371 (c)(1),
(2) Date: Feb. 21, 2022

(87) PCT Pub. No.: WO2021/032829
PCT Pub. Date: Feb. 25, 2021

(65) Prior Publication Data
US 2022/0360377 A1   Nov. 10, 2022

Related U.S. Application Data

(60) Provisional application No. 62/890,131, filed on Aug. 22, 2019.

(30) Foreign Application Priority Data

Sep. 5, 2019 (EP) .................................... 19195545

(51) Int. Cl.
*H04B 17/309* (2015.01)
*H04B 17/21* (2015.01)
(Continued)

(52) U.S. Cl.
CPC ............ *H04B 17/309* (2015.01); *G01W 1/00* (2013.01); *H04B 17/21* (2015.01); *H04L 5/0005* (2013.01);
(Continued)

(58) Field of Classification Search
CPC ....... H04B 17/309; H04B 17/21; G01W 1/00; G01W 2001/006; H04L 5/0005; H04L 5/008; H04W 4/38; H04W 4/40
See application file for complete search history.

(56) References Cited

U.S. PATENT DOCUMENTS 5,468,964 A     11/1995  Gopalsami et al.
10,587,501 B2 *  3/2020  Thubert ................ H04W 40/24
(Continued)

FOREIGN PATENT DOCUMENTS

CN     103680161 A     3/2014
JP     H10239250 A     9/1998
(Continued)

OTHER PUBLICATIONS

H.J Hansen, "Standoff Detection Using Millimeter and Submillimeter Wave Spectroscopy", Proceedings of the IEEE, vol. 95, No. 8, Aug. 2007, pp. 1691-1704.
(Continued)

*Primary Examiner* — Tejis Daya (57) ABSTRACT

A method for selecting a subset of devices from a plurality of devices in a wireless network to perform: a first function comprising transmitting, receiving and/or processing a first radio frequency signal in a first frequency band for detecting atmospheric conditions; and a second function comprising transmitting, receiving and/or processing a second radio frequency signal in a second frequency band, at least partially overlapping with the first frequency band, for performing network communications; wherein the first and the
(Continued)

second function are performed during a time period; and wherein the time period comprises a first subset of timeslots and a second subset of timeslots; wherein the method comprises: selecting the subset of devices based on a physical location of the devices relative to an area in which atmospheric conditions are to be monitored; assigning the first subset of timeslots to each of the selected devices to perform the first function, wherein the first subset of timeslots is assigned based on a priority value associated with the relative priority of performing the first function compared to the second function; assigning the second subset of timeslots to each of the selected devices to perform the second function; controlling the selected devices to execute the first function and the second function during the assigned timeslots respectively.

15 Claims, 5 Drawing Sheets

(51) Int. Cl.
*H04L 5/00* (2006.01)
*H04W 4/38* (2018.01)
*H04W 4/40* (2018.01)
*G01W 1/00* (2006.01)

(52) U.S. Cl.
CPC .............. *H04L 5/008* (2013.01); *H04W 4/38* (2018.02); *H04W 4/40* (2018.02)

(56) References Cited

U.S. PATENT DOCUMENTS

| | | | |
|---|---|---|---|
| 2006/0058926 A1* | 3/2006 | Abbott | G04G 15/00 |
| | | | 701/1 |
| 2012/0024044 A1 | 2/2012 | Tao et al. | |
| 2014/0172133 A1 | 6/2014 | Snyder | |
| 2014/0347074 A1 | 11/2014 | Nadeau | |
| 2015/0259078 A1 | 9/2015 | Filipovic et al. | |
| 2017/0238129 A1* | 8/2017 | Maier | H04W 4/029 |
| | | | 455/404.2 |
| 2019/0068120 A1 | 2/2019 | Gudeman et al. | |
| 2021/0058170 A1* | 2/2021 | Wendt | H04L 5/0005 |

FOREIGN PATENT DOCUMENTS

| | | |
|---|---|---|
| JP | 2014160979 A | 9/2014 |
| JP | 2018164413 A | 10/2018 |
| WO | 2015077626 A1 | 5/2015 |
| WO | 2015077644 A1 | 5/2015 |

OTHER PUBLICATIONS

Branko Leskovar, et al., "Detection and Measurements of Air Pollutants and Constituents by Mellimeter-Wave Microwave Spectroscopy", Lawrence Berkeley National Laboratory, Apr. 21, 2011, pp. 1-17.

Shuo Liu, et al., "Low-Cost Gas Sensors Utilizing mm-Wave Radars", ieee.org, 2017, pp. 1853-1854.

* cited by examiner

METHOD TO IMPROVE RF-BASED ATMOSPHERIC CONDITIONS DETECTION AND RF-BASED NETWORK COMMUNICATIONS

CROSS-REFERENCE TO PRIOR APPLICATIONS

This application is the U.S. National Phase application under 35 U.S.C. § 371 of International Application No. PCT/EP2020/073316, filed on Aug. 20, 2020, which claims the benefits of European Patent Application No. 19195545.9, filed on Sep. 5, 2019, and U.S. Patent Application No. 62/890,131, filed on Aug. 22, 2019. These applications are hereby incorporated by reference herein.

FIELD OF THE INVENTION

The invention relates to a method, a system and a computer program product for selecting a subset of devices from a plurality of devices in a wireless network to perform a first function and a second function. The first and the second function relates to detecting atmospheric conditions and to performing network communications respectively.

BACKGROUND

Connected lighting refers to a system of one or more lighting devices which are controlled not by (or not only by) a traditional wired, electrical on-off or dimmer circuit, but rather by using a data communication protocol via a wired or more often a wireless connection, e.g. a wired or wireless network. These connected lighting networks form what is commonly known as Internet of Things (IoT) or more specifically Internet of Lighting (IoL). Typically, the lighting devices, or even individual lamps within a lighting device, may each be equipped with a wireless receiver or transceiver for receiving lighting control commands from a lighting control device according to a wireless networking protocol such as Zigbee, Wi-Fi or Bluetooth.

Recent developments in wireless network technology have resulted in the development of highly reliable, low-cost, and high-performance radios that operate in what used to be the exotic domain of millimeter wave frequency band, comprising band of radio frequency (RF) spectrum between 30 GHz and 300 GHz. The name 'millimeter wave (mm wave)' originates from the fact that the wavelength range of this band is from about 10 mm to less than 1 mm. While much of the millimeter wave spectrum is licensed, a portion around the 60 GHz spectrum can be freely used for communication which now is addressed by the standardization task force IEEE802.11ay.

Communication in many fields is moving to mm-wave in order to escape the crowded 2.4 GHz and 5 GHz spectrum and enable broadband communication. There are many interesting properties of mm-waves which, for example, make it possible to not only communicate over this frequency but also measure air quality.

SUMMARY OF THE INVENTION

The inventors have realized that both RF-based air quality measurement and RF-based network communication can beneficially be provided via the same device in a wireless network. However, to prevent low quality RF-based air quality measurement, the RF signal used for air quality measurement should not be impacted by any RF signal used for network communications.

It is therefore an object of the present invention to optimize air quality measurement by allocating spectrum for RF-based air quality measurement along a route comprising at least two (communication) devices, in lieu of RF-based network communications occurring along the same path at the same time.

According to a first aspect, the object is achieved by a method for selecting a subset of devices from a plurality of devices in a wireless network to perform: a first function comprising transmitting, receiving and/or processing a first radio frequency signal in a first frequency band for detecting atmospheric conditions; and a second function comprising transmitting, receiving and/or processing a second radio frequency signal in a second frequency band, at least partially overlapping with the first frequency band, for performing network communications; wherein the first and the second function are performed during a time period; and wherein the time period comprises a first subset of timeslots and a second subset of timeslots; wherein the method comprises: selecting the subset of devices based on a physical location of the devices relative to an area in which atmospheric conditions are to be monitored; assigning the first subset of timeslots to each of the selected devices to perform the first function, wherein the first subset of timeslots is assigned based on a priority value associated with the relative priority of performing the first function compared to the second function; assigning the second subset of timeslots to each of the selected devices to perform the second function; controlling the selected devices to execute the first and the second function during the assigned timeslots respectively.

The method comprises selecting a subset of devices from a plurality of devices to perform a first function and a second function; wherein the first and the second functions comprise transmitting, receiving and/or processing a first and a second radio frequency signal (e.g. a 60 GHz) in a first and a second frequency band (e.g. mm wave band) for detecting atmospheric conditions and performing network communications respectively. The first and the second function may also be called as RF-based atmospheric conditions detection and RF-based network communications respectively. The first and the second frequency band may be at least partially overlapping, e.g. the first and the second function may use mm-wave band for both detecting atmospheric conditions and for performing network communications. The selection may be based on a physical location of the device with respect to an area where the atmospheric conditions are to be monitored. Furthermore, for each of the selected subset of devices, a time period for performing both functions may be divided into a first subset and a second subset of timeslots; and assign the first subset of timeslots to the first function and the second subset of timeslots to the second function. Since, for the selected subset of devices, based on a priority value, respective timeslots are assigned to perform both RF-based air quality measure (i.e. atmospheric conditions detection) and network communications, the quality of RF-based air quality measure (atmospheric conditions detection), in lieu of RF-based network communications, occurring along the same path at the same time is optimized. The atmospheric conditions may comprise the state of the atmosphere, e.g. the conditions may comprise the state of the atmosphere in terms of one or more of detecting atmospheric pollutants, detecting gaseous substance in the air, measuring humidity, air moisture etc. Other examples defining atmospheric conditions known to a skilled person are not excluded.

According to an embodiment, the selected subset of devices may be further arranged to transmit information about detected atmospheric conditions in the second subset of timeslots; wherein the information is obtained in the first subset of timeslots.

When the selected subset of devices is used to detect the atmospheric conditions in the first subsets of timeslots, the information about the detected conditions such as quantity of the detected atmospheric pollutants in the atmosphere, level of gaseous substance etc. may be transmitted in the second subset of timeslots. Therefore, the selected subset may advantageously use the timeslots reserved for network communications to transmit the detected atmospheric conditions information as well. The information may be obtained after processing of the first signal. The information may be transmitted to a server and/or to a neighboring device.

According to an embodiment, the priority value may be determined for each of the selected subset of devices based on a relative position of the selected devices within the area in which atmospheric conditions are to be monitored.

The timeslots are assigned to each selected subsets of devices based on a priority value; wherein the priority value may be assigned based on proximity of the selected devices to the area of interest. The relative position of the selected devices may be relative to each other within the area. The relative position of the selected devices may be relative to the area. The relative position of the selected devices may be relative to the to-be-monitored atmospheric conditions. A priority value is associated with the relative priority of performing the first function compared to the second function. The priority value may be a vector of values each associated with performing the first function compared to the second function. The elements of the vector may be respectively associated with selected subsets of devices. The priority value may be between 0 and 1; e.g. 0 indicates low priority and 1 indicates high priority. For example, the selected devices comprised in the area may be assigned a relatively higher priority value, for instance 0.8 to perform the first function (RF-based atmospheric conditions detection) and a smaller priority value, such as 0.2 to perform the second function (RF-based network communications). Similarly, the priority value may linearly or non-linearly decrease or increase as a function of the proximity of the selected devices with the area. Therefore, based on the proximity, the selected device may spend less or more time for RF-based atmospheric conditions detection.

According to an embodiment, the priority value may be indicative of communication traffic in the wireless network, such that the assigning of the first subset of timeslots may be further based on communication traffic in the wireless network.

The priority value may be based on the communication traffic in the wireless network. The priority value may be based on network load in the wireless network. In an example, for the selected devices with a relatively high communication load, the priority value may be assigned based on the communication load, such that the selected devices having a higher communication load may spend more time to perform RF-based network communications.

According to an embodiment, the method may further comprise receiving an input at a subsequent time period; wherein the input may be indicative of a tracking information of an atmospheric pollutants layer with respect to the area.

An atmospheric pollutants layer may be a cloud of atmospheric pollutants, e.g. an air toxication. The cloud may be moving from an area to another area. The tracking information may comprise the location of the cloud, e.g. GPS coordinates. The tracking information may be received from a network external to the wireless network. Alternatively, it may be generated by the wireless network.

According to an embodiment, the method may further comprise modifying the selected subset of devices based on the received input.

When an input, which is indicative of the tracking information of atmospheric pollutants cloud is received at a subsequent time period, the spatial location of the atmospheric pollutants cloud may be different from the spatial location at the previous time period. The selected subset of devices may be modified based on the received input, e.g. additional devices from the plurality of devices, for instance based on the physical location relative to the atmospheric pollutants cloud, may be added to the selected subset. If one or more devices in the selected subset is no longer in the proximity of the atmospheric pollutants cloud at the subsequent time period, the one or more selected devices may be removed from the selected subset.

According to an embodiment, the method may further comprise modifying the priority value based on the received input; assigning the first subset of timeslots for each of the devices in the selected subset of devices based on the modified priority value.

The priority value may be modified based on the received input. For example, based on the spatial location of the atmospheric pollutants cloud, the priority value may be modified while keeping the selected subset same. For instance, the selected device which is located in the area of atmospheric pollutants cloud at a subsequent time period is assigned a higher priority value compared to the case when the selected device was not located in the area at the previous time period. By modifying the priority value and/or the selected subset of devices, the detection of moving atmospheric pollutants cloud may be optimized.

According to an embodiment, the plurality of devices may comprise at least one lighting device; and wherein a light output of the at least one lighting device may be controlled via the second function.

In this advantageous embodiment, the plurality of devices may comprise at least one lighting device, e.g. an outdoor lighting device such as a light pole, or an indoor lighting device. In an outdoor environment, the infrastructure of light poles may be advantageously leveraged to use RF-based atmospheric conditions detection with the RF-based network communications; wherein the RF-based network communications may be used to control a light output of the light poles. For example, the RF-based network communications may be used to control color, color temperature, intensity, beam width, beam direction, illumination intensity, and/or other parameters of one or more of light sources of the at least one lighting device.

According to an embodiment, the plurality of devices may comprise at least one airborne device; and wherein the at least one airborne device may be selected based on the altitude difference between the selected at least one airborne device and another one of the selected subset of devices to detect atmospheric conditions above the other selected subset of devices.

In case, if the altitude of the area where the atmospheric conditions are to be monitored is higher compared to the altitude of the selected subset of devices, an airborne device may be used for RF-based atmospheric conditions detection. For example, at least one of the selected subset of devices may be arranged for transmitting mm-wave and the at least one airborne device may be arranged for receiving and/or processing the mm-wave signal for RF-based atmospheric conditions detection and RF-based network communications. Alternatively, the at least one airborne device may be used as a transmitter and at least one of the selected subset of devices may be used as a receiver. Another option is that the at least one airborne device may be used a transmitter and at least one further airborne device may be used as receiver.

According to an embodiment, selecting the subset of devices may be further based on one or more of: hardware capabilities of at least one of the plurality of devices, wireless interference close to at least one of the plurality of devices, altitude of at least one of the plurality of devices, orientation of at least one of the plurality of devices.

In this embodiment, some further selection criteria are defined for the selection of the subset of devices. For instance, participation in RF-based atmospheric conditions detection typically requires the transmitter to send extra wireless messages and the receiver to receive wireless message and/or a processor to process the wireless messages. This requires additional processing and memory resources and it is therefore beneficial to assess available processing and memory resources as a selection criterion. Wireless interference close to devices may also be an important factor in selecting the subset of devices. Assessing interference- and reachability-related criteria makes it possible to avoid devices that are likely to suffer or have been determined (e.g. based on historical data) to suffer from wireless interference affecting the device's ability to perform RF-based atmospheric conditions detection. Additionally, or alternatively, based on the to-be-monitored area, the altitude may be an important factor for selected the subset of devices. For example, devices mounted at a high altitude, e.g. on a topographic high point in the city or on top of high-rise building may be suitable as it may cover a larger area.

According to an embodiment, the selected subset of devices may comprise a first set of devices comprised in the area in which atmospheric conditions are to be monitored and a second set of devices having a communication link with the first set.

One of the choices for the selection of the subset of devices may comprise the first set of devices which are directly located in the area together with the second set of devices having a communication link with the first set. The priority value may be accordingly assigned. Since the atmospheric conditions directly affect these first and second set of devices, the detection of atmospheric condition can be better optimized.

According to an embodiment, the atmospheric conditions may comprise air ionization, wherein the first function comprises transmitting, receiving and/or processing the first radio frequency signal in the first frequency band for detecting air ionization.

Air is a mixture of gases including nitrogen, oxygen, water vapor, carbon dioxide etc. which are ionized. We live in the ocean of air ions. Actually ions are nothing but atoms or molecules which have lost or gained electrons. Air ionisers have seen increasing use for improving indoor air quality, including applications designed to reduce the transmission of infection in healthcare environments. In this embodiment, the first radio frequency signal in the first frequency band may be used for detecting air ionization. The detection may comprise qualitative and quantitative air ionization measurements and/or monitoring. The quality of measurement may be within a precision threshold.

According to an embodiment, during each of the first subset of timeslots at least one device in the selected subset of devices may be arranged for transmitting the first radio frequency signal in the first frequency band; and at least one device in the selected subset of devices may be arranged for receiving, and/or processing the first radio frequency signal in the first frequency band.

The selected subset of devices may comprise at least a transmitter and at least a receiver to optimize a communication route for RF-based atmospheric conditions detection. The receiver may also have processing capabilities to receive and process the first RF signal to perform RF-based atmospheric conditions detection.

According to an embodiment, the processing of the first radio frequency signal in the first frequency band for detecting atmospheric conditions may be performed by an external network, wherein the external network is external to the wireless network.

Alternative to performing processing of the RF signal for detecting atmospheric pollutants locally by the receiver, the received RF signal may be transmitted to an external network, such as a server, and wherein the processing may be performed by an processing unit comprised in the external network. It is beneficial when the receiver is a resource constrained device and does not allow processing of the received RF signal for RF-based atmospheric conditions detection.

According to a second aspect, the object is achieved by a system for selecting a subset of devices from a plurality of devices in a wireless network to perform: a first function comprising transmitting, receiving and/or processing a first radio frequency signal in a first frequency band for detecting atmospheric conditions; and a second function comprising transmitting, receiving and/or processing a second radio frequency signal in a second frequency band, at least partially overlapping with the first frequency band, for performing network communications; wherein the first and the second function are performed during a time period; and wherein the time period comprises a first subset of timeslots and a second subset of timeslots; wherein the system comprises: a controller arranged for executing the steps of the method according to the first aspect; the plurality of devices, at least one of devices in the plurality of devices comprising: a communication unit arranged for transmitting and/or receiving the first and the second radio frequency signals in the first and the second radio frequency bands; a processor arranged for processing the first and the second radio frequency signals; and a memory arranged for storing wireless network communication signals.

According to a third aspect, the object is achieved by a computer program product comprising instructions configured to cause a controller according to the second aspect to execute the steps of the method of according to the first aspect.

It should be understood that the computer program product and the system may have similar and/or identical embodiments and advantages as the above-mentioned methods.

BRIEF DESCRIPTION OF THE DRAWINGS

The above, as well as additional objects, features and advantages of the disclosed methods, systems and devices will be better understood through the following illustrative and non-limiting detailed description of embodiments of devices, systems and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Communication in many fields is moving to mm-wave frequency band in order to escape the crowded 2.4 GHz and 5 GHz frequency band spectrum and enable broadband communication. This can for example be the last mile connectivity between the location with optical fiber access, for instance on the roof of a building, and lighting poles which make use of the available data rate not only for lighting controls but e.g. for public Wi-Fi installations, security camera image backhaul or other data intense services.

There are many interesting properties of mm-waves which make it possible to not only communicate over this frequency but also e.g. measure air quality. Millimeter-wave (30-300 GHz) frequency band contains the fundamental rotational resonance frequencies of many molecular gases composed of carbon, nitrogen, oxygen and sulfur. The high specificity of the rotational spectra to organic molecules affords mm-wave spectroscopy having potential use in remotely sensing atmospheric conditions. The detection of airborne chemicals is gaining importance for environmental monitoring. For example, monitoring and/or measuring atmospheric pollutant caused by industrial waste, biodegradable waste etc.

Figure 1:
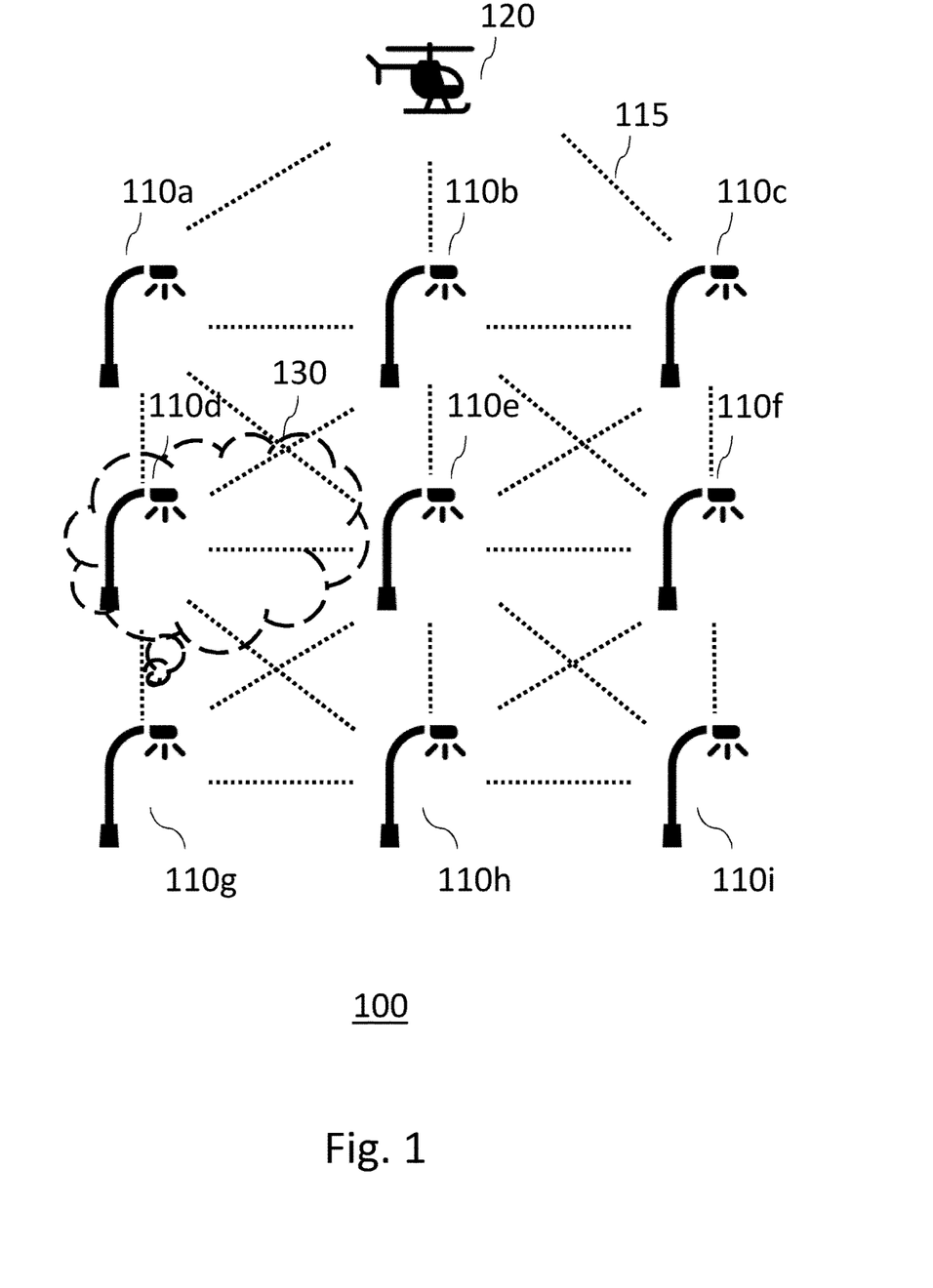
FIG. 1 shows schematically and exemplary an embodiment of a system for selecting a subset of devices from a plurality of devices in a wireless network to perform a first and a second function.

FIG. 1 shows schematically and exemplary an embodiment of a system 100 for selecting a subset of devices from a plurality of devices 110a-i in a wireless network to perform a first and a second function. The first function (RF-based atmospheric conditions detection) comprises transmitting, receiving and/or processing a first radio frequency signal in a first frequency band for detecting atmospheric conditions 130 and the second function (RF-based network communications) comprises transmitting, receiving and/or processing a second radio frequency signal in a second frequency band, at least partially overlapping with the first frequency band, for performing network communications.

The first and the second frequency bands may comprise mm-wave frequency bands. Millimeter wave (also millimeter band) is the band of spectrum between 30 gigahertz (GHz) and 300 GHz. The first and the second radio frequency signals may comprise a 60 GHz signal. The (communication) devices 110a-i may, for a time period, advantageously be used for both RF-based atmospheric conditions detection and RF-based network communications using the first and the second frequency bands; wherein the bands may be at least partially overlapping. In an example, the frequency bands may be fully overlapping, e.g. the devices using 60 GHz to detect atmospheric conditions 130 and performing network communications. In the exemplary figure, the atmospheric condition 130 is shown as atmospheric pollutant 130.

In FIG. 1, the plurality of devices 110a-i is exemplary shown as light poles. The plurality of devices 110a-i may be sensor devices, gateways or any other type of device with network communications capabilities. The plurality of devices 110a-i, the light poles in this example, may be connected in a mesh network such that each of the plurality of devices 110a-i have a communication link 115 with a neighboring device 110a-i as shown by the dotted line 115 in FIG. 1. Other network topologies such as star topology may also be possible. In such a (lighting) system 100, the plurality of (lighting) devices are controlled not by (or not only by) a traditional wired, electrical on-off or dimmer circuit, but rather by using a data communications protocol via a wired or more often wireless connection, e.g. a wired or wireless network, e.g. according to a wireless networking protocol such as Zigbee, Wi-Fi or Bluetooth. Therefore, a light output of the (lighting) device 110a-i may be controlled via the second function (RF-based network communications).

The atmospheric conditions may comprise the state of the atmosphere. The condition may comprise atmospheric pollutants. Atmospheric pollutants 130 are substances that accumulate in the air to a degree that is harmful to living organisms or to materials exposed to the air. Common atmospheric pollutants 130 include smoke, smog, and gases such as carbon monoxide, nitrogen and sulfur oxides, and hydrocarbon fumes. While gaseous pollutants are generally invisible, solid or liquid pollutants in smoke and smog are easily seen. Detecting atmospheric pollutants 130 may comprise detecting and monitoring atmospheric pollutants 130 in an area, e.g. presence (yes/no) of an atmospheric pollutant 130, detecting amount of atmospheric pollutants 130 in the atmosphere etc. The atmospheric condition may comprise gaseous substance in the air, humidity, air moisture etc. Gaseous substances in air may shift in concentration due to e.g. effects during sunny days like ozone. Other examples defining atmospheric conditions are not excluded.

A subset of devices may be selected based on a physical location of the devices 110a-i relative to the area in which atmospheric conditions 130 are to be monitored. For example, the selected subset of devices may comprise a first set of devices 110d comprised in the area in which atmospheric conditions 130 are to be monitored and a second set of devices 110a, 110b, 110e, 110g and 110h having a communication link with the first set.

The selection of the subset of devices 110a-i may further for instance based on hardware capabilities of the plurality of devices, such as the devices 110a-i with a transceiver to support mm-wave frequency band and a processor to process the mm-wave frequency band may be selected.

Wireless interference close to devices may be an important factor in selecting the subset of devices 110d, 110a, 110b, 110e, 110g and 110h, because the devices affected by high wireless interference may not be suitable to perform RF-based atmospheric conditions 130 detection.

Furthermore, based on the to-be-monitored area, the altitude may be considered for selecting the subset of devices 110d, 110a, 110b, 110e, 110g and 110h. For example, a device mounted on top of a high-rise building may be a candidate to perform RF-based atmospheric conditions 130 detection and RF-based network communications at high altitude to cover a larger area.

The time period for performing the first and the second functions may comprise a first subset of timeslots and a second subset of timeslots. Each of the selected subset of devices 110d, 110a, 110b, 110e, 110g and 110h may be assigned the first subset of timeslots for performing the first function (RF-based atmospheric conditions 130 detection) and the second subset of timeslots for performing the second function (RF-based network communications). The assignment of timeslots may be based on a priority value associated with the relative priority of performing the first function compared to the second function. The priority value may be a vector of values each associated with performing the first function compared to the second function for each of the selected subset of devices 110d, 110a, 110b, 110e, 110g and 110h. The priority value may be between 0 and 1, or the sum of priority value may be equal to 1 or may be any real number. The priority value may be a relative value (vector) defined for each first/second subset of timeslots and for each device in the selected subset and it shows the importance of the first function compared to the second function. The priority value may be determined for each of the selected subset of devices based on a relative position of the selected devices with the area in which atmospheric conditions 130 are to be monitored. For example, the priority value may linearly decrease/increase as a function of proximity of the selected devices with the area. The decrease/increase may be non-linear (e.g. exponential, hyperbolic etc.). As an example, in FIG. 1, the selected device 110d may be assigned a higher priority value to perform RF-based atmospheric conditions 130 detection compared to the other selected subset of devices 110a, 110b, 110e, 110g and 110h. In that case, the selected device 110d spends more time in performing RF-based atmospheric condition 130 detection and less time in performing RF-based network communications compared to other selected subset of devices 110a, 110b, 110e, 110g and 110h. The selected devices 110d, 110a, 110b, 110e, 110g and 110h are then controlled to execute the first and the second functions during the assigned timeslots.

Alternatively, or additionally to determining the priority value based on proximity, the priority value may be based on communication traffic in the wireless network, such that the assigning of the first subset of timeslots may be further based on communication traffic in the wireless network. For example, if for a time period the communication traffic is high in the wireless network e.g. selected subset of devices 110d, 110a, 110b, 110e, 110g and 110h are controlled via the RF-based network communications to render a light scene, the priority value for the RF-based network communications is higher compared to the RF-based atmospheric conditions 130 detection. The selected devices 110d, 110a, 110b, 110e, 110g and 110h may spend more time in performing RF-based network communications compared to performing RF-based atmospheric conditions 130 detection.

The system 110 may further comprise an airborne device 120, wherein the at least one airborne device 120 may be selected based on an altitude difference between the selected at least one airborne device and the other selected subset of devices to detect atmospheric conditions 130 above the other selected subset of devices. In this example, the airborne device 120 is a helicopter, other type of airborne device 120, e.g. drones, UAVs etc. may be used. For performing RF-based atmospheric conditions 130 detection, the airborne device 120 may be arranged to act as a transmitter to transmit the first RF signal in the first frequency band and the other selected subset of devices 110d, 110a, 110b, 110e, 110g and 110h may be arranged to act as a receiver to receive the first RF signal in the first frequency band and process the received first RF signal for detecting atmospheric conditions 130. Alternatively, the other selected subset of devices 110d, 110a, 110b, 110e, 110g and 110h may be arranged to act as a transmitter and airborne device 120 may be arranged to act as a receiver and/or processor to process the received first RF signal. In another embodiment, the airborne device 120 may be arranged to act as a transmitter and another airborne device 120 may be arranged to act as receiver and/or processor.

Figure 2:
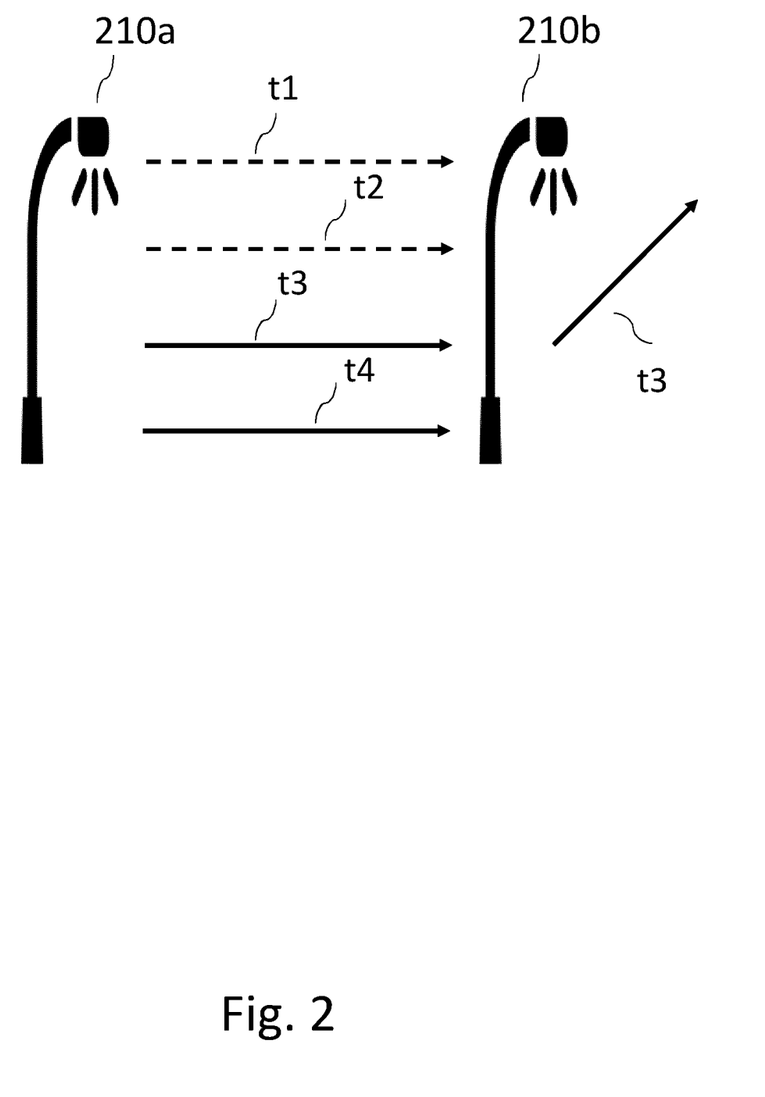
FIG. 2 shows schematically and exemplary communication between devices during a time period.

FIG. 2 shows schematically and exemplary communication between (selected) devices 210a-b during a time period t1-t4 according to an embodiment of the method. The devices 210a-b comprised in the selected subset of devices to perform RF-based atmospheric conditions detection and RF-based network communications. In this exemplary figure, the first subset of timeslots comprises timeslots t1 and t2 (as shown with dotted lines) are assigned for RF-based atmospheric conditions 130 detection. The assignment is based on the priority value. For instance, the priority value for selected devices 210a-b for timeslots t1-t2 is 0.8 for RF-based atmospheric conditions 130 detection and 0.2 for RF-based network communications. In case the priority value is equal for both functions, the assignment of timeslots may be based on a user input, historical data of the devices etc. In this exemplary figure, the second subset of timeslots comprises timeslots t3 and t4 (as shown with solid lines) are assigned for RF-based network communications. For instance, the priority value for the selected devices 210a-b for timeslots t3-t4 may be 0.2 for RF-based atmospheric conditions detection and 0.8 for RF-based network communications. Therefore, in the exemplary figure, for the first subset of timeslots t1-t2, the selected devices 210a-b are arranged to perform RF-based atmospheric conditions detection (shown by dotted line) and for the second subset of timeslots t3-t4, the selected devices 210a-b are arranged to perform RF-based network communications (shown by solid lines). The priority value may be different for both devices 210a-b for timeslot t1 and timeslot t2 or for timeslot t3 and timeslot t4.

At t1, the device 210a may transmit the first RF signal in the first frequency band, e.g. mm-wave band. The first frequency band may comprise frequency signals suitable to perform RF-based atmospheric conditions detection, e.g. oxygen quickly absorbs 60 GHz signals. The device 210b may receive the first RF signal at t1 and may process the received RF signal to detect atmospheric conditions. At t2, the device 210a may repeat the transmission, and the device 210b may repeat the reception and/or processing. During the first subset of timeslots t1-t2, if the device 210b does not have processing capabilities, the device 210b may receive the first RF signal and may store the received first RF signal at t1 and/or at t2 in a memory (not shown) of the device 210b. The processing of the first RF signal in the first frequency band for detecting atmospheric conditions may then be performed by an external network (not shown), wherein the external network is external to the wireless network. During the first subset of timeslots t1-t2, the second RF signals in the second frequency band (if any) may be stored in a memory (not shown) of the device 210a; wherein the size of memory may depend on the length of the first subset of timeslots t1-t2. As an example, if the device 210*a* is placed in a polluted area, the device 210*a* spends more time in RF-based atmospheric conditions detection, and hence the length of the first subset of timeslots t1-t2 may be long and a memory with bigger size is required.

At t3, the device 210*a* may transmit the second RF signal in the second frequency band for RF-based network communications and the device 210*b* may receive the second RF signal. The second RF signal may comprise, e.g. a control command to control the device 210*b*. At t3, the device 210*b* may transmit the stored first RF signal, which is stored during the first subset of timeslots t1-t2 to an external network. The processing of the first RF for RF-based atmospheric conditions detection signal may then be performed in the external network or the processing may be performed partly in the device 210*b* and partly in the external network. In an example, when the device 210*b* performs the processing of the first RF signal for RF-based atmospheric conditions detection, the device 210*b* may further transmit information about detected atmospheric conditions at t3. Information about the detected atmospheric conditions may comprise a presence/absence indicator of the atmospheric pollutants, a qualitative level assesment of the gaseous substance in the air, a humidity level, an air moisture level, a quantative measurement of atmospheric polllutant in a suitable unit (e.g. atmospheric gas concentrations may be expressed as a mixing ratio in ppm (parts per million) or ppb (parts per billion)).

At t3, the device 210*a* may transmit the stored second RF signals, which are stored during the first subset of timeslots t1-t2. The communication may comprise control signals, sensor signals etc. At t4, the device 210*a* may repeat the transmission, and the device 210*b* may repeat the reception and/or processing. The device 210*b* may also repeat the transmission of the second RF signal for processing or transmission of information about the detected atmospheric conditions. In an embodiment, the first subset of timeslots and the second subset of timeslots may be overlapping. For example, in such embodiment, a broad spectrum may be used with a mixture of frequencies to perform the first function and the second function in a non-sequential way. In another example, the first subset of timeslots and the second subset of timeslots may be partially overlapping.

Figure 3:
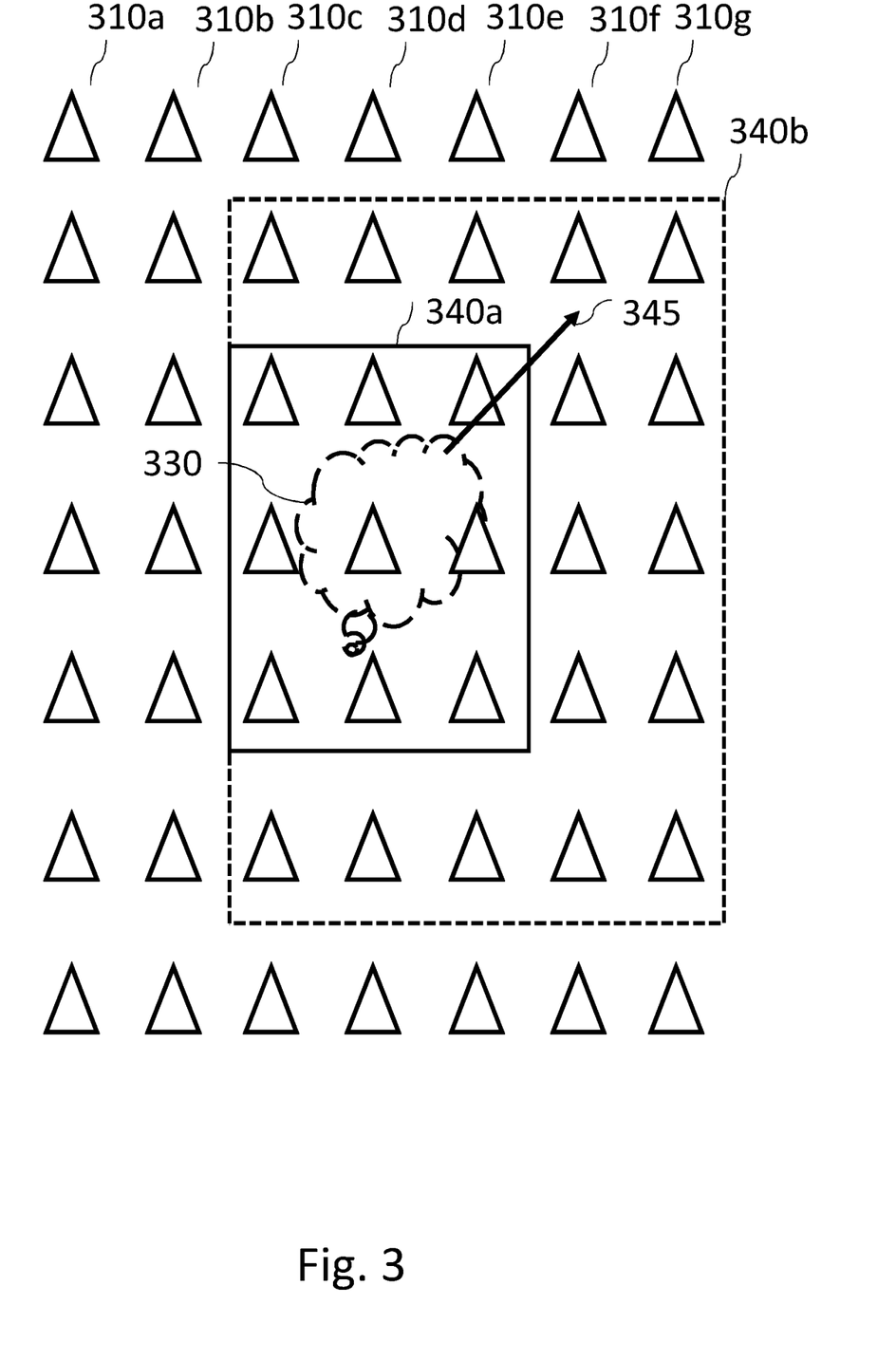
FIG. 3 shows schematically and exemplary an embodiment of a method for selecting a subset of devices from a plurality of devices in a wireless network to perform a first and a second function.

FIG. 3 shows schematically and exemplary another embodiment of a method for selecting a subset of devices from a plurality of devices in a wireless network to perform a first and a second function. In FIG. 3, a plurality of devices 310*a-g* (not all the devices are numbered) are shown. The plurality of devices 310*a-g* may be sensors, lighting devices or any other form of devices. The plurality of devices 310*a-g* may be comprised in an outdoor environment or an indoor environment. A subset of devices from the plurality of devices 310*a-g* may be selected to perform both the RF-based atmospheric conditions 330 detection and the RF-based network communications in an area 340*a* represented by a solid rectangle. The atmospheric conditions 330 may be an atmospheric pollutants layer, e.g. a pollutant cloud such as toxication in air. An example of pollutant cloud is atmospheric brown cloud, which is created by a range of airborne particles and pollutants from combustion (e.g., woodfires, cars, and factories), biomass burning and industrial processes with incomplete burning. The selected subset of devices in the area 340*a* may be selected to perform both RF-based atmospheric conditions 330 detection and RF-based network communications in a time period; wherein the time period comprises a first subset of timeslots and a second subset of timeslots. Each selected subset of devices in the area 340*a* may be assigned the first subset of timeslots to perform the first function (RF-based atmospheric conditions detection) and the second subset of timeslots to perform the second function (RF-based network communications) based on the priority value. The priority value may be based on proximity of each of the selected devices to the atmospheric conditions 330.

At a subsequent time period, the spatial location of the atmospheric pollutant 330 may change with respect to the area 340*a*. The direction of the change of spatial location of the atmospheric pollutant 330 is indicated by the arrow 345, i.e. in this example, the atmospheric pollutants 330 moves in the upper right direction. The atmospheric pollutants cloud 330 may move, expand or shrink over time. An input comprising the tracking information may be received at the subsequent time period. The input comprising the tracking information may be generated by the (wireless) network comprising the plurality of devices 310*a-g* or by an external network. The tracking information may comprise the spatial location of the (moving/expanding/shrinking) atmospheric pollutants 330 with respect to the area 340*a*.

Based on the received input, the selected subset of devices may be modified. In an example, when the atmospheric pollutants 330 moves to a new area 340*b* (shown by a dotted rectangle), the area 340*b* may be then defined for the monitoring. The new area 340*b* may be overlapping with the previous area 340*a*. In this example, the previous area 340*a* is fully comprised in the new area 340*b*. The modification of the selected subset of devices may comprise adding additional devices in the selected subset and/or removing already selected devices from the selected subset. In FIG. 3, the devices comprised in the new area 340*b* and not in the previous area 340*a* are added to the selected subset of devices. As the previous area 340*a* is comprised in the new area 340*b*, no devices are removed from the selected subset of devices.

Alternatively, or additionally to modifying the selected subset of devices, the priority value may be modified based on the received input. The modified priority value may be assigned to the first subset of timeslots for each of the (modified) selected subset of devices. When the atmospheric pollutants 330 moves from an area 340*a* to the new area 340*b*, the priority value may be modified based on the spatial location of the atmospheric pollutants 330. For example, the priority value for the devices which are comprised in the atmospheric pollutants 330 at a subsequent time period may be modified in a such a way that they may spend more time in performing RF-based atmospheric pollutants 330 detection. Similarly, the priority value for the devices which are not comprised in the atmospheric pollutants 330 at a subsequent time period may be modified in a such a way that they may spend more time in performing RF-based network communications.

Figure 4:
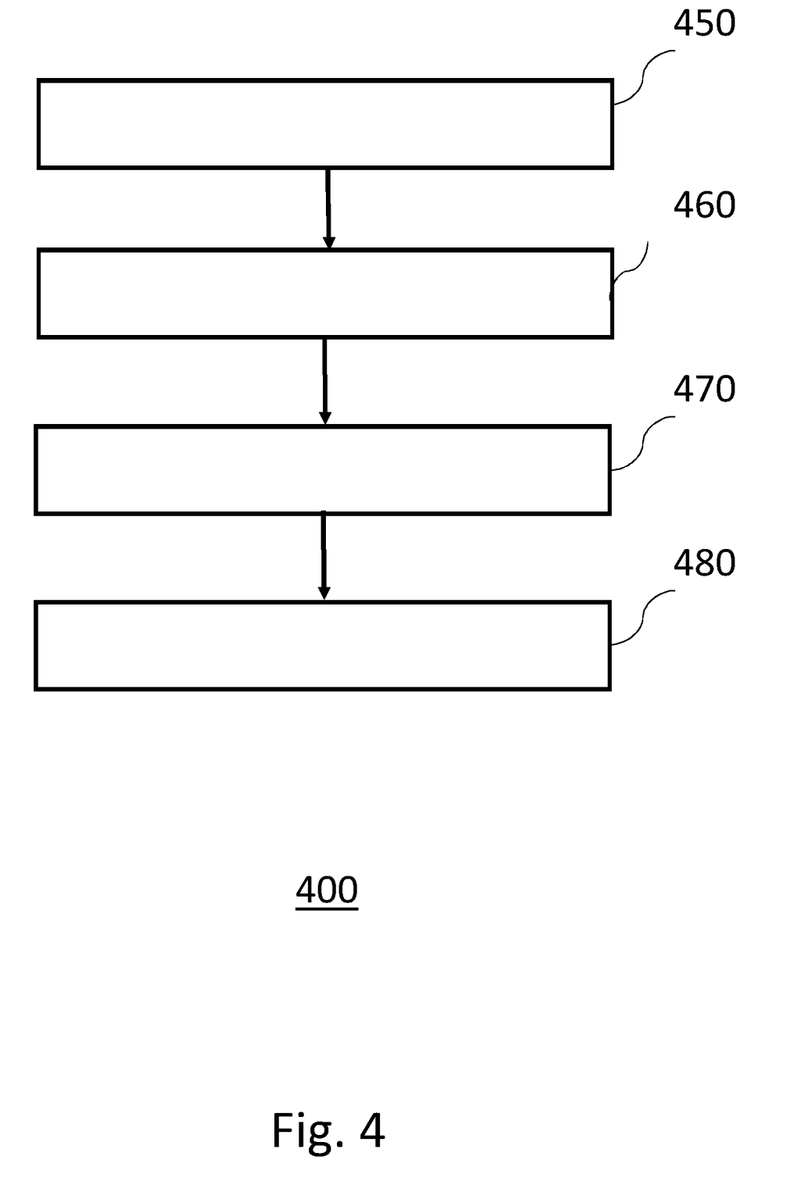
FIG. 4 shows schematically and exemplary a flowchart illustrating a method for selecting a subset of devices from a plurality of devices in a wireless network to perform a first and a second function.

FIG. 4 shows schematically and exemplary a flowchart illustrating a method 400 for selecting a subset of devices from a plurality of devices in a wireless network to perform a first and a second function. In step of selecting 450, a subset of devices from a plurality of devices are selected to perform the first function and the second function based on a physical location of the devices relative to an area 340*a*, 340*b* in which atmospheric conditions 130, 330 are to be monitored. The first function comprises transmitting, receiving and/or processing a first radio frequency signal in a first frequency band for detecting atmospheric conditions; and the second function comprises transmitting, receiving and/or processing a second radio frequency signal in a second frequency band, at least partially overlapping with the first frequency band, for performing network communications. The selection 450 of the subset of devices may further be based on hardware capabilities of each of the plurality of devices, wireless interference close to each of the plurality of devices, and/or altitude of each of the plurality of devices.

In the step of assigning 460, a first subset of timeslots comprised in a time period for each of the selected devices is assigned to perform the first function (RF-based atmospheric conditions detection), wherein the first subset of timeslots may be assigned based on a priority value associated with the relative priority of performing the first function compared to the second function. The priority value may be determined for each of the selected subset of devices based on a relative position of the selected devices with the area 340a, 340b in which atmospheric conditions 130,330 are to be monitored.

In the step of assigning 470, a second subset of timeslots, also comprised in the time period, for each of the selected devices to perform the second function. In the step of controlling 480, the selected devices are controlled to execute the first and the second functions during the assigned timeslots. The steps of the method may be executed by a controller. The controller may be implemented in a unit separate from the plurality of devices 110a-g, such as wall panel, desktop computer terminal, or even a portable terminal such as a laptop, tablet or smartphone. Alternatively, the controller may be incorporated into one or more of the plurality of devices 110a-g. Further, the controller may be implemented in the area 340a, 340b or remote from the area 340a, 340b (e.g. on a server); and the controller may be implemented in a single unit or in the form of distributed functionality distributed amongst the plurality of devices 110a-g or a distributed amongst server comprising multiple server units at one or more geographical sites. Furthermore, the controller may be implemented in the form of software stored on a memory (comprising one or more memory devices) and arranged for execution on a processor (comprising one or more processing units), or the controller may be implemented in the form of dedicated hardware circuitry, or configurable or reconfigurable circuitry such as a PGA or FPGA, or any combination of these.

Figure 5:
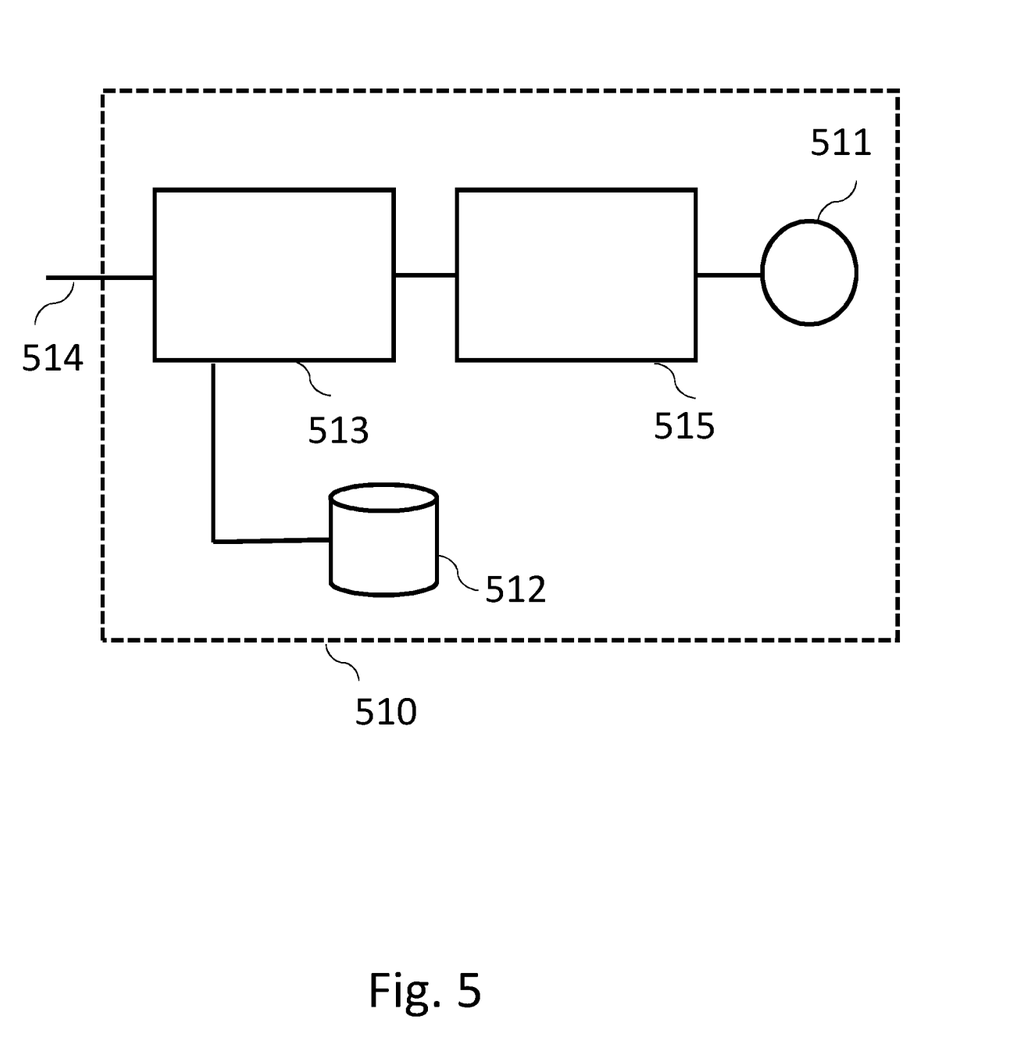
FIG. 5 shows schematically and exemplary a device to perform a first and a second function according to an embodiment of the method.

FIG. 5 shows schematically and exemplary a device according to an embodiment of a method. As an example, the device 510 is shown to be a lighting device or a luminaire with a light source 511. A luminaire 510 is a device or structure arranged to emit light suitable for illuminating an environment, providing or substantially contributing to the illumination on a scale adequate for that purpose. A luminaire 510 comprises at least one light source 511 or lamp, such as an LED-based lamp, gas-discharge lamp or filament bulb, etc., optionally any associated support, casing or other such housing. Each of the luminaires 510 may take any of a variety of forms, e.g. a ceiling mounted luminaire, a wall-mounted luminaire, a wall washer, or a free-standing luminaire (and the luminaires need not necessarily all be of the same type), outdoor light pole etc.

The device 510 may comprise a communication unit 513 which may be arranged for transmitting and/or receiving a first and a second radio frequency signal in a first and a second radio frequency band. The communications unit 513 allows the device to communicate with other devices and/or a central controller such as a lighting controller and/or Building Management System (BMS) via an input interface unit 514. The unit 513 may comprise a wireless transceiver and may provide communication over radio frequency, using a protocol such as Wi-Fi, Bluetooth or Zigbee. The input interface 514 may be used to receive an input at a subsequent time period; wherein the input is indicative of a tracking information of an atmospheric pollutants layer with respect to the selected subset of devices.

The device 510 may comprise a memory unit 512, such as one or more random access memories (RAMs), read-only memories (ROMs), dynamic random access memories (DRAMs), fast cycle RAMS (FCRAMs), static RAM (SRAMs), field-programmable gate arrays (FPGAs), erasable programmable read-only memories (EPROMs), electrically erasable programmable read-only memories (EEPROMs), microcontrollers, or microprocessors. The memory unit 512 may be arranged for storing the received first signal for RF-based atmospheric conditions detection and/or the second RF signal for RF-based network communications.

The device 510 may comprise a processing unit 515 which is arranged for processing the first and the second radio frequency signals. The steps of the method 400 may be executed the processing unit 515 of the device 510.

In an example, the atmospheric conditions may comprise air ionization. Air ionisers (not shown) have seen increasing use as devices for improving indoor air quality, including applications designed to reduce the transmission of infection in healthcare environments. Air ionizers (not shown) are well known devices which firstly had been applied for cleanrooms in semiconductor manufacturing sites. Such devices generally blow a stream of positive and/or negative air ions into room air, where they remove particulate matter through increased gravitational deposition and electrostatic attraction to walls and other surfaces. Air ionization may be performed using electrical ionizers which generate ions in a process known as corona discharge. Other processes for ionizing air are also well-known in the art. The typically used ionizer modules consist of one or more sharp ionizer pins driven with a high-tension voltage. Dust is typically collected at these pins and lead to reduced functionality especially if the dust is humid or otherwise conductive. (If a combination of both positive and negative ions is used, the dust accumulation may be somewhat mitigated.) Monitoring of air ionizing is performed in industrial settings since mid-20th century to assess the air quality in manufacturing clean rooms.

Air ionization monitoring in a room may be performed by ion counters as known in the prior art. But monitoring using ion counters have many drawbacks and not easy to use. One reason is that the concentration may hyper-locally differ due to airflow and ion drifting. In addition, the measurement devices often generate noise as they use fans to suck the to-be-analyzed air in. Therefore, methods disclosed in prior art have the drawback of consuming ions and in that reducing the ion concentration during counting of ions.

The first radio frequency signal (e.g. 60 GHz) in a first frequency band (millimeter wave) for detecting air ionization may comprise detecting an interaction between air charges and the first radio frequency signal. This allows for remote qualitative and within limits quantitative air ionization measurements. The detection of air ionization may comrpise monitoring and/or measurement of air ionization which allows assessment of an entire air volume as penetrated by the radio frequency beam. Such a measurement hence shows the coaction effect of multiple air ionizers (not shown) mounted within the same building space (not shown). In addition, the complex influences of air movements and air flow shadowing can be monitored.

In an example, the detection of air ionization may based on a damping effect on the first radio frequency signal when penetrating ionized air. In an example, the detection of air ionization may comprise abnormality detection of an ionizer system (not shown), for instance, looking for deviations from normal in ion concentration of the air. Such abnormality detection, e.g., does not require measuring the ion concentration, for instance, close to the mouth of an occupant of an area. Similarly, the ionizing system may also be employed only for upper air disinfection, hence relying on airflow to bring the to-be-cleaned air into the upper airspace of the room above 2.3 m height). When directly measuring the ionizing of the breathed in air, the the first radio frequency signal is supposed to penetrate the air volume in vicinity of the heads of an occupant. As hotter humid air as exhausted by the occupants tends to flow upwards the placement is directly above the heads of people sitting in a meeting room.

The first radio frequency signal is transmitted in a volume of air which should be tested for sufficient ionization. The transmitter or transceiver of the first radio frequency signal may be integrated in a lighting device or may be an external device external to the lighting device. The ionization system (not shown) results in charging particles like dust or air humidity. When the first radio frequency interacts with a charged particle, the first radio frequency signal gets scattered. The scattered first radio frequency may be received, by a receiver, and analyzed to perform the first function of detecting air ionization. The receiver may be may be integrated in a lighting device or may be an external device external to the lighting device. The processing may be done at the same receiver or at an external device, e.g. an external computer, cloud etc. A control device (not shown) may be arranged for controlling the transmitter/receiver/receiver for transmitting, receiving and processing the first radio frequency signal for detecting air ionization. The control device may be integrated in a lighting device and/or external to the lighting device. A charged mist particles in air produce a pronounced backscatter. The higher the charge the more of the first radio frequency signal energy is scattered and can be measured at locations other than directly forward. In this example, at least two antennas (e.g. transmitter and a receiver antennas) may be used to measure the loss in RF transmission due to the scatter.

In an example, the transmission of the first radio frequency signals are directed in a way that the first radio frequency signal is not directly reaching occupants in order to minimize any radiation on occupants. For example, a lighting device may be arragned for transmitting the first radio frequency signal; and wherein the detection of air ionization is assigned to a pair of lighting devices which may be advatageously located in a room lighting device for minimizing RF exposure of the occupants while still being able to measure the ionization in the air volume of interest close to the head of the occupants. Alternatively, and/or additionally, the pair of lighting device may be assigned such that the the first radio frequency stays well spatially clear of other interference and reflection objects such as metal surfaces (HVAC ducts) and mirrors. Therefore the beam only travels in free air and hence only scatter causes wireless signals to reach a receiving lighting device. Optionally, based on WiFi CSI, a subset of multipath signals may be selected for determining the ionization; for instance, the reflected wireless multipath from a whiteboard metal surface on the wall is discarded in the measurement on ionization and only more direct scatter signal paths (with the shorter time of flight) of the 60 GHz WiFi CSI is used.

In an example, one or more transmitters, e.g. the lighting device, of the first radio frequency signals are placed out of beam axis. In another example, one or more transceivers of the first radio frequency signals operate time sequentially as transmitters (e.g. to transmit the first radio frequency signal) and receivers (e.g. to receive the scattered first radio frequency signal). In another example, data stations like integrated in laptops or other mobile devices may serve as scatter energy detectors. Mapping of location of those may be possible with the mm-wave beam steering capabilities. The system simply has to guarantee that stations are not directly addressed by beams and are able to search for scatter. In another example, the scatter diagnostics happens alongside a normal transmission towards other receivers with a focused beam.

By the proposed method, a space distribution of ionized particles can be back calculated (using similar algorithms as the back projection used for computer tomography). The more transmitters and receivers are taken into account the better is the observation of local ionization. This may help to localize even single failing inizers or non-operating ventilation. In an example, the transciever/transmitter/receiver of the first radio frequency signal may be integrated together with the lighting installation and/or the ionizer system. In an example, in combination with multiple RF transmitters/monitors the room location for less scatter can be used to locate activity of ionizers, actual distribution of ionized air and/or non-functioning air ionizers. In another example, the ionizer system gets feedback over distribution of ionized air in order to optimize power consumption and/or wear of ionizers. In another example, the information on nonsufficient ionization and/or the indication of the very failing ionizer may automatically lead to a service call. In another example, the air ionizer operation utilizes coded ionizer methodology. The scatter-receiver uses the ionizer modulation pattern to learn in which radio frequency scatter originates from scattering by the ions in the air vs other radio frequency scatter effects present in the room unrelated to the activity of the ionizer.

The method 400 may be executed by computer program code of a computer program product when the computer program product is run on a processing unit 515 of a computing device, such as the processor 515 of the device 510.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method for selecting a subset of devices from a plurality of devices in a wireless network to perform:
  a first function comprising transmitting, receiving and/or processing a first radio frequency signal in a first frequency band for detecting atmospheric conditions; and
  a second function comprising transmitting, receiving and/or processing a second radio frequency signal in a second frequency band, at least partially overlapping with the first frequency band, for performing network communications;
  wherein the first and the second function are performed during a time period; and wherein the time period comprises a first subset of timeslots and a second subset of timeslots;
  wherein the method comprises:
  selecting the subset of devices based on a physical location of the devices relative to an area in which atmospheric conditions are to be monitored;
  assigning the first subset of timeslots to each of the selected devices to perform the first function, wherein the first subset of timeslots is assigned based on a priority value associated with the relative priority of performing the first function compared to the second function;
  assigning the second subset of timeslots to each of the selected devices to perform the second function; and
  controlling the selected devices to execute the first and the second function during the assigned timeslots respectively.

2. The method according to claim 1, wherein the selected subset of devices is further arranged to transmit information about detected atmospheric conditions in the second subset of timeslots; wherein the information is obtained in the first subset of timeslots.

3. The method according to claim 1; wherein the priority value is determined for each of the selected subset of devices based on a relative position of the selected devices within the area in which atmospheric conditions are to be monitored.

4. The method according to claim 1, wherein the priority value is indicative of communication traffic in the wireless network, such that the assigning of the first subset of timeslots is further based on communication traffic in the wireless network.

5. The method according to claim 1, wherein the method further comprises:
  receiving an input at a subsequent time period; wherein the input is indicative of a tracking information of an atmospheric pollutants layer with respect to the area.

6. The method according to claim 5; wherein the method further comprises modifying the selected subset of devices based on the received input.

7. The method according to claim 5, wherein the method further comprises:
  modifying the priority value based on the received input; and
  assigning the first subset of timeslots for each of the devices in the selected subset of devices based on the modified priority value.

8. The method according to claim 1, wherein the plurality of devices comprises at least one lighting device; and wherein a light output of the at least one lighting device is controlled via the second function.

9. The method according to claim 1, wherein the plurality of devices comprises at least one airborne device; and wherein the at least one airborne device is selected based on an altitude difference between the selected at least one airborne device and another one of the selected subset of devices to detect atmospheric conditions above the other selected subset of devices.

10. The method according to claim 1, wherein selecting the subset of devices is further based on one or more of:
  hardware capabilities of at least one of the plurality of devices,
  wireless interference close to at least one of the plurality of devices,
  altitude of at least one of the plurality of devices, and
  orientation of at least one of the plurality of devices.

11. The method according to claim 1; wherein the atmospheric conditions comprise air ionization; wherein the first function comprises transmitting, receiving and/or processing the first radio frequency signal in the first frequency band for detecting air ionization.

12. The method according to claim 1; wherein during each of the first subset of timeslots,
  at least one device in the selected subset of devices is arranged for transmitting the first radio frequency signal in the first frequency band; and
  at least one device in the selected subset of devices is arranged for receiving, and/or processing the first radio frequency signal in the first frequency band.

13. The method according to claim 1; wherein processing of the first radio frequency signal in the first frequency band for detecting atmospheric conditions is performed by an external network, wherein the external network is external to the wireless network.

14. A system for selecting a subset of devices from a plurality of devices in a wireless network to perform:
  a first function comprising transmitting, receiving and/or processing a first radio frequency signal in a first frequency band for detecting atmospheric conditions; and
  a second function comprising transmitting, receiving and/or processing a second radio frequency signal in a second frequency band, at least partially overlapping with the first frequency band, for performing network communications;
  wherein the first and the second function are performed during a time period; and wherein the time period comprises a first subset of timeslots and a second subset of timeslots;
  wherein the system comprises:
  a controller configured to:
    select the subset of devices based on a physical location of the devices relative to an area in which atmospheric conditions are to be monitored;

assig the first subset or timeslots to each of the selected devices to perform the first function, wherein the first subset or timeslots is assigned based on a priority value associated with the relative priority of performing the first function compared to the second function;

assign the second subset of timeslots to each of the selected devices to perform the second function; and control the selected devices to execute the first and the second function during the assigned timeslots respectively;

the plurality of devices, at least one of devices in the plurality of devices comprising:

a transceiver arranged for transmitting and/or receiving the first and the second radio frequency signals in the first and the second radio frequency bands;

a processor arranged for processing the first and the second radio frequency signals; and a memory arranged for storing the first and the second radio frequency signals.

15. A non-transitory computer program product comprising instructions configured to cause a controller to execute the method of claim 1.

\* \* \* \* \*